United States Patent [19]

Melcher

[11] Patent Number: 4,893,848
[45] Date of Patent: Jan. 16, 1990

[54] HOSE COUPLING

[75] Inventor: Edward L. Melcher, Grosse Pointe Park, Mich.

[73] Assignee: Winzeler Stamping Company, Montpelier, Ohio

[21] Appl. No.: 268,452

[22] Filed: Nov. 8, 1988

[51] Int. Cl.$^4$ .............................................. F16L 33/20
[52] U.S. Cl. ..................................... 285/258; 285/259; 285/423; 285/906; 285/921
[58] Field of Search ............... 285/258, 423, 256, 259, 285/906, 246, 94

[56] References Cited

U.S. PATENT DOCUMENTS

| | | |
|---|---|---|
| 867,108 | 9/1907 | Carmer . |
| 1,915,041 | 6/1933 | Wallace ................................ 285/258 |
| 1,977,917 | 10/1934 | Norgern . |
| 2,216,839 | 10/1940 | Hoffman .............................. 285/258 |
| 2,268,142 | 12/1941 | Lusher et al. ....................... 285/258 |
| 2,424,863 | 7/1947 | Swain . |
| 2,880,020 | 3/1959 | Audette . |
| 2,902,299 | 9/1959 | Turner ................................ 285/258 |
| 2,924,009 | 2/1960 | Muzeika ........................... 265/258 X |
| 3,262,721 | 7/1966 | Knight . |
| 3,308,998 | 3/1967 | Oppasser et al. . |
| 3,833,019 | 9/1974 | Diggs ............................... 285/259 X |
| 4,099,744 | 7/1978 | Kutnyak et al. . |
| 4,152,017 | 5/1979 | Abramson . |
| 4,313,628 | 2/1982 | Duenke . |
| 4,474,392 | 10/1984 | Vassallo . |
| 4,524,997 | 6/1985 | Ebert ................................ 285/258 X |
| 4,664,423 | 5/1987 | Rowley ........................... 285/423 X |

FOREIGN PATENT DOCUMENTS

| | | | |
|---|---|---|---|
| 1089603 | 3/1955 | France ................................ 285/258 |
| 331932 | 9/1958 | Switzerland ....................... 285/258 |

Primary Examiner—Dave W. Arola
Attorney, Agent, or Firm—Marshall & Melhorn

[57] ABSTRACT

A coupling assembly for hoses, fabricated of plastic and comprising one-piece male and multi-piece snap together female coupling sections. The male section includes an externally threaded fitting and an integral hub adapted to fit over the end of a hose section, the hub having internal circumferential ribs or barbs. A ferrule inserted into the hose expands the hose wall into engagement with the barbs for securing the section to the hose. The female section includes an annular collar likewise fitted over and secured to the end of a hose section. An annular flange is formed on the collar, and an internally threaded connector is provided, including an inwardly turned annular lip adapted to snap over and engage behind the flange for rotatably mounting the connector on the collar. The barbs are specially configured to bite into the hose material and resist separation of the coupling section from the hose in response to axial forces tending to pull them apart.

11 Claims, 3 Drawing Sheets

HOSE COUPLING

BACKGROUND OF THE INVENTION

1. Field of the Invention

This invention pertains generally to hose couplings, and more particularly to plastic couplings for the ends of flexible, resilient hoses of the so-called garden hose type.

2. Description of the Prior Art

Garden hoses made of various forms of rubber and plastic, are generally provided with so-called male and female end couplings by which the hoses are connected to one another, to faucets or spigots supplying liquid thereto, and to nozzles, sprinklers, etc. for dispensing the liquid. On currently marketed hoses such couplings, which are permanently affixed to the hose ends during production of the hose assembly, are generally of two types. In one, threaded male and female couplers of plastic or brass have a barbed stem which is inserted into the hose end. A clamp member, generally of brass, surrounds the external periphery of the hose and urges it into liquid-tight engagement with the stem. In the other, the threaded male and female couplers, generally of brass or the like, include a tubular sleeve which fits over the outer end of the hose. A ferrule, again of brass or the like, is inserted into the hose end and permanently expanded outwardly to urge the hose into liquid-tight engagement with the tubular sleeve.

The hoses tend to bend most sharply immediately adjacent the coupling during normal use and, after repeated flexing, tend to develop cracks around the coupling until they eventually leak and even break completely off of that point. The metallic components are fabricated of relatively thin sections so that they are easily bent out of shape and permanently deformed by being stepped upon or run over by vehicles. As a result, it may be impossible to couple the hose to an appropriate associated male or female coupling unit or, if it can be so coupled, the joint connection may leak.

Metallic couplings of the aforedescribed types are relatively costly to fabricate and assemble. Both the material itself and the forming process are comparatively expensive. The female units comprise two separate pieces which must be assembled before the coupling is affixed to the hose, thereby complicating the assembly process.

It has been found that the hoses themselves tend to have a longer service life than the prior art original couplings. As a result, replacement couplings have been developed which can be applied to a hose end by the user in place of the original factory applied coupling. One such unit comprises a barbed stem for insertion into the hose, with an external clamp, such as a conventional screw clamp, for securing the hose around the stem. Another, as disclosed in U.S. Pat. No. 4,313,628, typically includes an external sleeve adapted to fit over the end of the hose, with a tapered bushing which threads into the hose and spreads or flares it outwardly against the sleeve. Such replacement couplings have not proven entirely satisfactory in that in either type, due to insertion of a member inside the hose, the diameter is effectively reduced and liquid flow is constricted. The external clamp or tapered internal bushing tends to loosen and allow the coupling to leak and eventually to pull apart. With the tapered insert, the stress is concentrated at the widest portion of the insert during assembly and thereafter, creating an area of likely hose failure.

SUMMARY OF THE INVENTION

In accordance with the invention there is provided a coupling assembly for hoses, fabricated of plastic and comprising basic one-piece male and two-piece female coupling sections. The male section comprises an externally threaded fitting of standard dimensions and an integral coaxial hub adapted to slip over the end of the hose. The hub is provided with internal circumferential barbs of generally sawtooth configuration. The unit may be affixed to the hose end by inserting an expandable ferrule into the end of the hose and permanently deforming the ferrule to expand the hose material into engagement with the barbed interior surface of the hub. Alternatively, a plastic ferrule having external barbs similar to but oppositely directed from those of the hub, may be pressed into the end of the hose to expand it into engagement with the interior surface of the hub.

The female coupling section may comprise a two-piece snap-together unit including an annular collar adapted to slip over the end of the hose and having internal circumferential barbs similar to these of the male section. The annular collar is affixed to the hose end by means similar to those employed with the male section. An annular flange is formed on the collar, and an internally threaded connector is provided for coupling the collar to the male section. The connector has an inwardly turned annular lip adapted to snap over and engage behind the flange on the collar. The barbs are specially configured to bite into the hose material and resist separation of the coupling section from the hose in response to axial forces tending to pull them apart.

It is an object of the present invention to provide durable, resilient plastic couplings for hoses;

Another object of the invention is to provide such couplings which are less expensive to fabricate and assemble than comparable metallic couplings;

Another object of the invention is to provide such couplings having a greater sectional modulus so as to increase the strength of the unit;

Another object is to provide a coupling which does not materially constrict flow through the hose;

Another object is to provide a coupling which is flexible and resilient so as to return to its normal configuration following temporary deformation;

Still another object is to provide such a coupling unit which is adapted for both original equipment and after-market repair use;

Yet another object is to provide a hose coupling having barbs on its hose contacting surfaces which tend to be drawn into the hose material so as to resist efforts to linearly pull the coupling from the hose.

Other objects and advantages will become more apparent during the course of the following description when taken in connection the accompanying drawings.

BRIEF DESCRIPTION OF THE DRAWINGS

In the drawings, wherein like numerals refer to like parts throughout.

DESCRIPTION OF THE PREFERRED EMBODIMENTS

Figure 1:
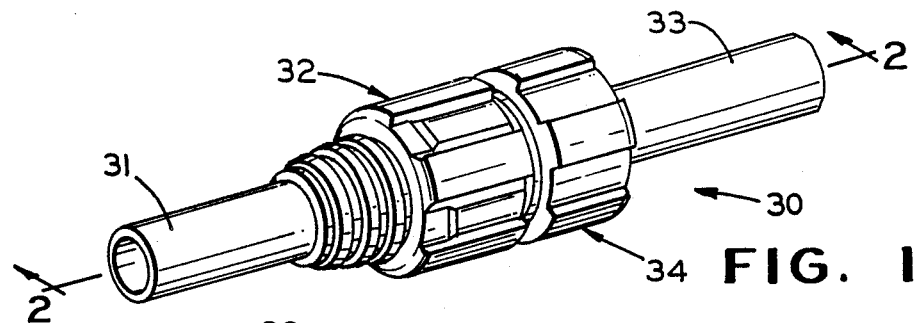
FIG. 1 is a perspective view of a hose coupling embodying the invention.

Referring now to the drawings, there is illustrated generally at 30 in FIG. 1 a hose coupling embodying the invention. More particularly, the hose coupling includes the end segment of a hose 31 to which is affixed a female coupling assembly 32 and a hose end segment 33 having a male coupling section 34 affixed thereto. The male and female couplings are adapted to be threadedly interconnected in the conventional manner. It will, of course, be understood that while the male and female sections are illustrated as being connected to one another, the female section may as well be connected to a faucet, spigot or other liquid source in the usual manner, while the male section may likewise be connected to a nozzle, sprinkler or other liquid dispensing device.

Figure 2:
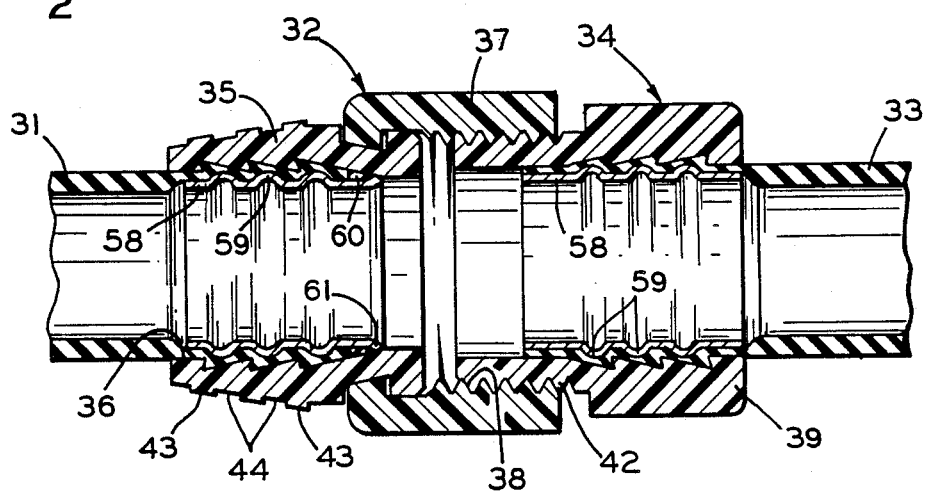
FIG. 2 is a longitudinal sectional view taken substantially along line 2—2 of FIG. 1.

As best seen in FIG. 2, the novel coupling 30 in a preferred embodiment comprises the female coupling assembly 32 of two-piece, snap-together construction and the male section 34 of one-piece construction. The female section more particularly includes an annular collar 35 having a central bore 36 extending therethrough of a diameter substantially equal to or slightly greater than the external diameter of the hose 31 so as to be capable of being readily slipped over the hose end. A tubular connecter 37, adapted to snap into place on the annular collar, as will be hereinafter described, is provided with internal threads 38 for connecting the female section to a corresponding male section 34. Such a male section, in turn, comprises a hub 39 and integral axially aligned fitting 40 having an axial bore 41 therethrough for receiving the hose end segment 33. The fitting is provided with external threads 42 for mating as with the threads 38 of the tubular connecter 37 to join the male and female coupling sections together or to other standard fixtures.

The male coupling section 34, annular collar 35 and tubular connector 37 are advantageously formed of a suitable durable but flexible and resilient plastic such as, for example, polypropylene. The female coupling assembly 32 is designed so that, if desired, the annular collar 35 can first be affixed to the hose segment 31, and then the tubular connector 37 can be assembled on the annular collar. To that end, the collar 35 is formed on its outer surface with a series of spaced annular ribs 43 separated by valleys 44, and terminates at its forward end in an annular flange 45 defining a channel 46 therebehind. The channel has a base 47 which slopes forwardly and inwardly for a purpose to be described. The forward corner of the flange 45 is chamfered to provide a sloping surface 48 for assisting with installation of the connector 37.

The tubular connector is formed at its rear extremity with an inwardly turned annular lip 49 which defines, with the threaded portion 38, a recess 50 for receiving the annular flange 45. The lip includes an inwardly facing annular surface 51 having a slope complementary to the base 47 of the channel 46. Thus, in assembling the female coupling assembly 32, the tubular connector 37 is aligned with and urged axially against the annular collar 35. Due to the flexible, resilient nature of the material from which the parts are fabricated, the tapered surface 51 of the lip 49 will tend to ride along the sloping surface 48 of the flange 45, causing relative deflection of the lip and flange, until the lip snaps into position within the channel 46 and engages behind the annular flange 45. At the same time, the flange snaps into position within the recess 50 and behind the lip 49. The complementary sloping surfaces 47 and 51, flange 45 and lip 49 thus coact to lock the collar 35 and connector 37 against axial movement relative to one another, while freely permitting rotational movement therebetween. In order to assist a user in grasping and rotating the tubular connector for connecting and disconnecting the hose, particularly with the wet hands often encountered in such operations, the external surface of the connector 37 is formed with a series of longitudinally extending ribs 52 separated by recessed areas 53.

Figure 3:
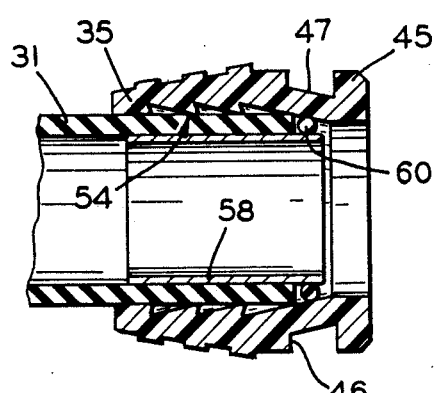
FIG. 3 is a longitudinal section illustrating the female coupling unit prior to expansion of the internal ferrule.
Figure 4:
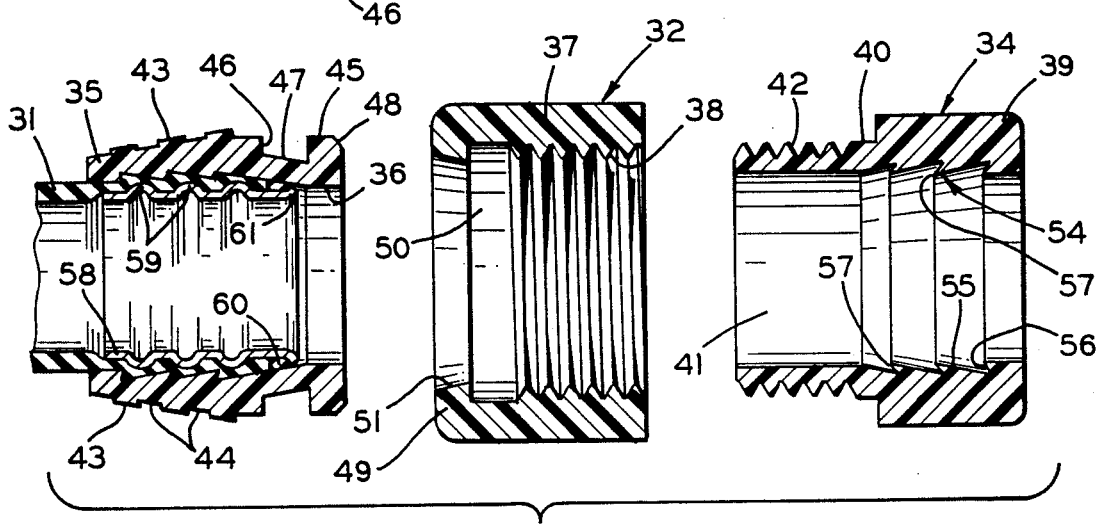
FIG. 4 is an exploded longitudinal sectional view of the coupling components, showing the inner ferrule in its expanded state.
Figure 5:
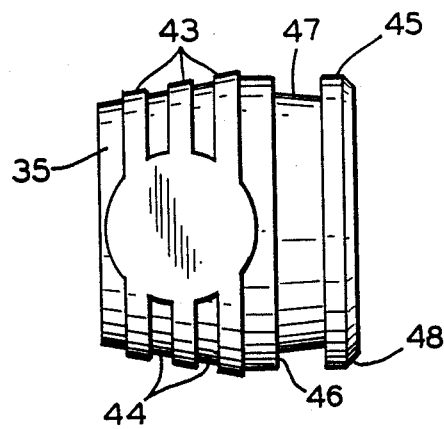
FIG. 5 is a side elevational view of the collar of the female coupling section.
Figure 6:
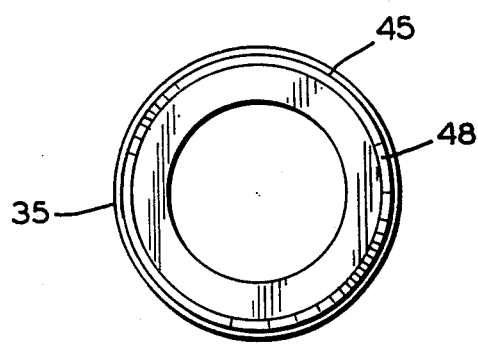
FIG. 6 is an end view of the collar as viewed from the right hand side in FIG. 5.
Figure 7:
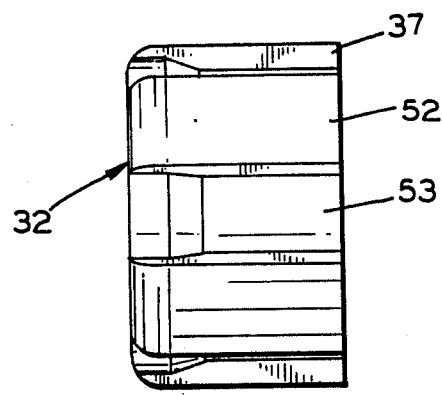
FIG. 7 is a side elevational view of the threaded connector of the female coupling section.
Figure 8:
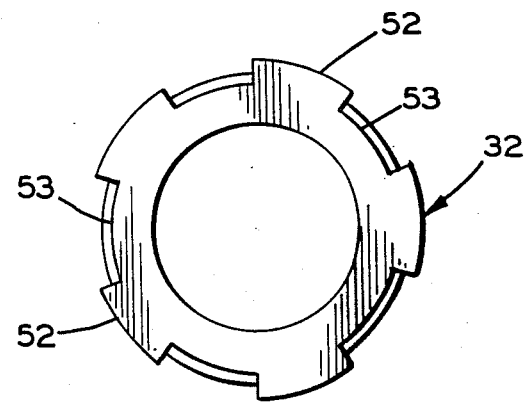
FIG. 8 is an end view of the threaded connector as viewed from the right hand side in FIG. 7.

Referring now in particular to FIGS. 2, 3, and 4, there is illustrated therein the novel arrangement by which the annular collar 35 and the male coupling section 34 are affixed to the hose end segments 31 and 33, respectively. The construction of the collar and coupling section are similar in this regard, and the two will be described together where appropriate. As will be apparent in FIG. 2, the coupling segments are affixed to the hose without significantly reducing the effective diameter of the flow path, and hence without appreciably diminishing the liquid carrying capacity of the coupled hoses. To that end, the diameter of the opening or bore through the coupling section 34 and the collar 35 is such that the members will slip axially over the appropriate one of the hose 31 or 33.

Formed on the interior surface of the coupling section and collar is a series of annular ribs 54 adapted to be pressed into the hose in seating engagement therewith. In order to securely engage the hose against axial withdrawal from the coupling section and collar, the annular ribs are formed with a unique negative rake angle configuration. Thus, the ribs 54 comprise sloping bases 55 terminating at radial walls 56. For a purpose to be described, the bases 55 and walls 56 define an included angle of somewhat less than 90° therebetween, and the walls 56 are inclined relative to the longitudinal axis of the hose. The bases and walls meet to form pointed apexes or barbs 57 at their junctures. The included angle between the sloping base 55 and the radial wall 56 may, for example, be on the order of 75°, while the walls 56 are disposed at an angle of about 15° from a plane normal to the longitudinal axis. The points of the apexes or barbs 57 are longitudinally aligned along a line parallel to the longitudinal axis of the coupling section and tubular connector.

In the embodiment of FIGS. 2, 3, and 4, a deformable ferrule 58 is inserted within the hose interior and permanently deformed to radially expand the hose material into engagement with the annular ribs 54. Thus, as shown in FIG. 3 a tubular ferrule 58 as of brass, having an outside diameter permitting it to easily fit within the hose, is axially inserted from the end, and a male coupling section 34 or annular collar 35 is slipped over the hose end as appropriate. The coupling section or collar may be placed in a circumferential die, and an expanding mandrel (not shown) is inserted in the conventional manner to expand and deform the ferrule. As the ferrule expands it compresses the resilient wall of the hose into conformity with the annular ribs 54. The mandrel is also configured to deform the wall of the expanded ferrule to a corrugated form, with the adjacent peaks 59 thereof spaced specifically between the annular ribs 54, and a peak 59 behind each wall 56 and apex 57. Thus, as will be readily apparent in FIGS. 2, 3, and 4, the expanded ferrule compresses the hose wall and depresses it into the recesses of the annular ribs 54 and permanently secures the coupling section or collar to the hose. The barbs and associated peaks 59 of the ferrule work against forces tending to axially pull the hose from the coupling member by driving the apexes 57 of the barbs into the surface of the hose.

Expansion of the ferrule within the hose in the aforedescribed manner provides a tight seal and prevents escape of liquid between the coupling member and hose. The plastic material from which the male and female coupling sections is formed is sufficiently resilient to maintain the integrity of the seal throughout the life of the hose in normal use. Thus, as illustrated in the male coupling section 34 of FIG. 2, the ferrule is positioned so that its end is flush with the end of the hose following expansion of the ferrule. Where deemed appropriate, additional sealing may be provided as illustrated with the annular collar 35 in FIGS. 2, 3, and 4. As shown therein, the end of the ferrule extends outwardly beyond the end of the hose 31, and an O-ring 61 encircles the ferrule adjacent the end of the hose within the annular collar. As the ferrule is expanded, the O-ring is compressed between the ferrule and collar to create an additional seal at that point. The adjacent end of the ferrule is flared outwardly to form a retaining lip 61 for the O-ring.

Figure 9:
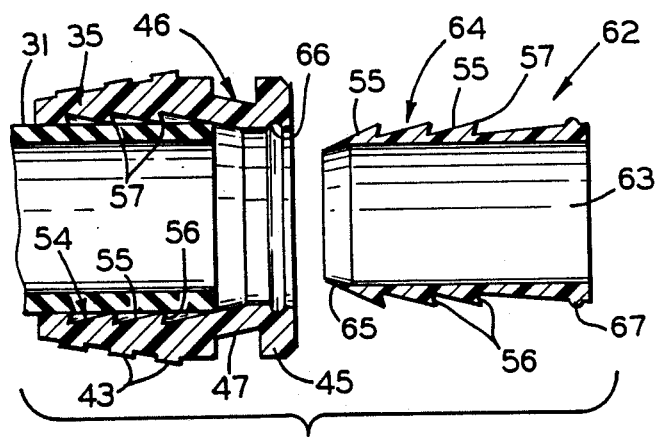
FIG. 9 is an exploded, longitudinal sectional view of an alternate embodiment of the female coupling section.
Figure 10:
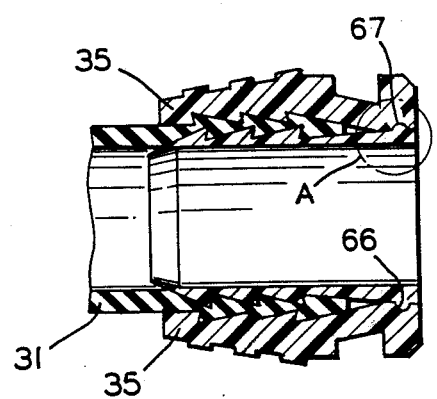
FIG. 10 is a longitudinal sectional view of the alternate embodiment in its assembled state.

There is disclosed in FIGS. 9 through 13 an alternate embodiment wherein a non-expanding ribbed plastic ferrule is employed in place of the permanently deformed expanded ferrule of the previously described embodiment. Such a ferrule may be employed with both the aforedescribed male coupling section 34 and the annular collar 35 with little or no modification. As best seen in FIGS. 9 and 10, a ferrule 62 is formed of resilient plastic similar to that from which the members 34, 35, and 37 are formed. The ferrule is adapted to be forced axially into the end of the hose and within the coupling section 34 (not shown) or annular collar 35 to expand the hose wall outwardly into engagement with the annular ribs 54. To that end, the ferrule is in the form of a tubular member 63 as of resilient plastic having an external diameter larger than the internal diameter of the hose 31 so that when forced into the hose end, it will expand the resilient hose wall outwardly into engagement with the annular ribs 54. The tubular member is formed on its outer surface with annular ribs or barbs 64 of a configuration similar to the ribs 54 within the members 34 and 35, but adapted to project in the direction opposite the ribs 54 when the ferrule is inserted into those members. The nose end of the ferrule has a slightly restricted portion 65 so that the sloping base 55 of the rib 64 at that end tapers to a point having a diameter slightly smaller than the hose 31. In assembling the coupling, the nose end can thus be readily entered into the hose in preparation for forcing the ferrule into the assembled position of FIG. 10.

Figure 11:
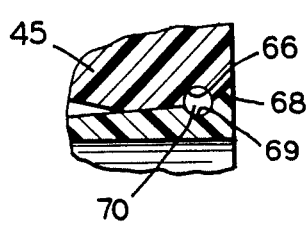
FIG. 11 is an enlarged fragmentary view of one embodiment of the portion shown at A in FIG. 10.
Figure 12:
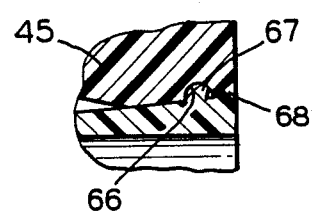
FIG. 12 is a view similar to FIG. 11 showing another embodiment of the portion.
Figure 13:
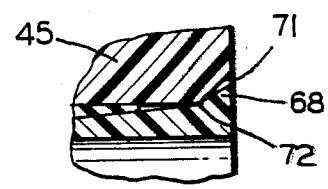
FIG. 13 is a view similar to FIGS. 11 and 12 showing still another embodiment of the portion.
Figure 14:
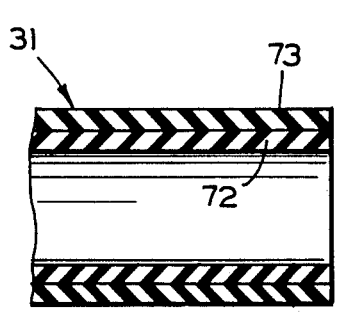
FIG. 14 is a longitudinal sectional view of an end portion of a two-ply hose to which a coupling section is to be applied.

Cooperating means may be provided adjacent the end of the collar and ferrule for locking the members together an/or providing a final seal at that point. Thus, as illustrated in FIGS. 9 and 10, the annular flange 45 may have formed in its base an inwardly facing annular channel 66 adapted to receive in snap-fitting relationship a mating annular protuberance 67 on the ferrule. Alternatively, the ferrule may be provided with an enlarged outer end 68 as shown in FIGS. 11, 12, and 13. The ferrule may include a channel 69, whereby the channels 66 and 69 cooperate to receive and Oring seal 70 as shown in FIG. 11. The ferrule may also include an annular protuberance 67 for snap-fitting reception in the channel 66 as shown in FIG. 12. In still another embodiment as depicted in FIG. 13, the flange 45 is chamfered at 71 to define an edge 72 for engaging the enlarged end 68 in the fully assembled position.

As will be apparent in FIG. 10, the opposed barbs inside the coupling cooperate to resist efforts to axially pull the hose from the coupling member. As tension is applied to the hose, the barbs on one member tend to further depress the hose into the depressions of the barbs on the other member and vice-versa. The joint has thus been found to have superior strength, and to actually exceed the strength of the hose itself. The embodiment of FIGS. 9 and 10 is particularly adapted to an inexpensive, easy-to-use repair kit inasmuch as the ferrule is merely driven axially into the hose, and no expansion equipment is required.

Figure 15:
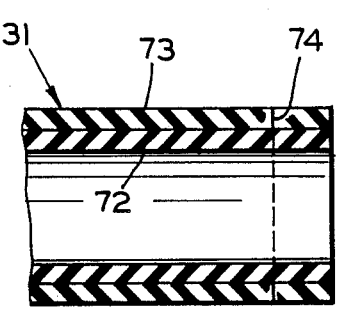
FIGS. 15, 16, and 17 are views similar to FIG. 14 showing sequential steps in preparing the hose end for reception of a coupling section.
Figure 16:
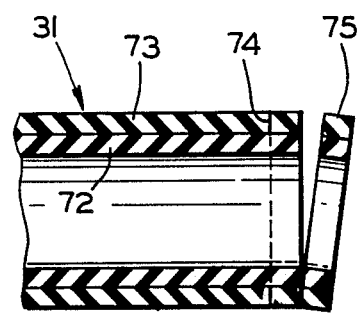
Figure 17:
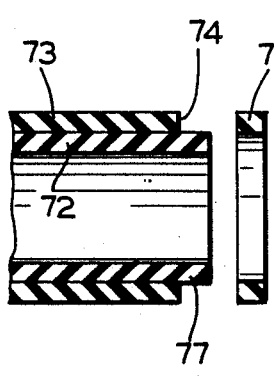
Figure 18:
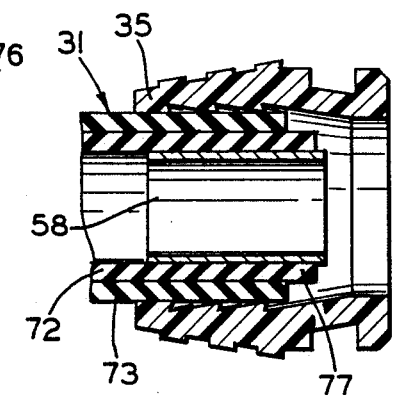
FIG. 18 is a longitudinal section showing the parts of a female coupling section in position for securing to the hose.
Figure 19:
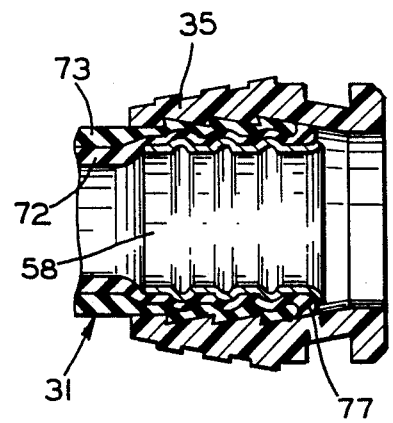
FIG. 19 is a view similar to FIG. 18 showing the completed coupling section.

There is shown schematically in FIGS. 14 through 19 a sequence of steps which may advantageously be performed in assembling the embodiment of FIGS. 2, 3, and 4. The hose 31 is of a construction having coextruded inner and outer plies 72 and 73, respectively, and may optionally include a reinforcing cord interlayer (not shown) therebetween. In the step of FIG. 15, the outer ply 73 is circumferentially severed at 74 a short distance from the end. An annular segment 75 is then removed (FIG. 16) to approximately square the end of the hose. Thereafter, the remaining ring 76 of the outer ply 73 is removed, leaving an exposed segment 77, and the annular collar 35 and ferrule 58 are assembled on the hose end. As the ferrule is expanded and permanently deformed (FIG. 19) the material of the inner ply is compressed and it, in turn, forces the outer ply into the recesses of the ribs 54. The inner ply tends to elongate, causing the exposed end segment 77 to curve outwardly over the end of the outer ply and fill the space around the ferrule.

Figure 20:
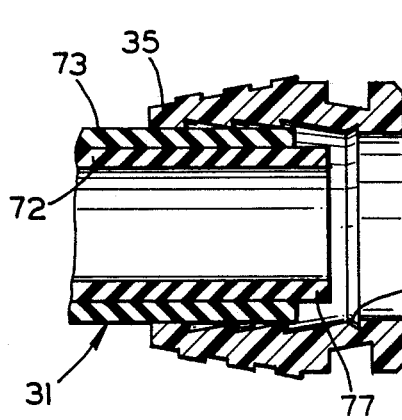
FIG. 20 is a longitudinal section showing parts of an alternate embodiment of a female coupling section in position for securing to the hose.
Figure 21:
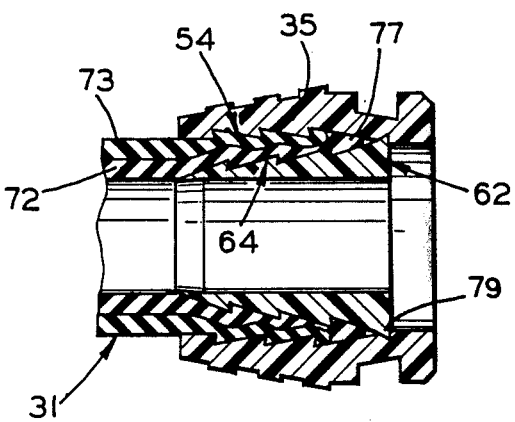
FIG. 21 is a view similar to FIG. 20 illustrating the completed coupling section.

The sequence of steps in assembling the embodiment of FIGS. 9 and 10 is illustrated in FIGS. 20 and 21. Again, the hose end is prepared as in FIGS. 14 through 17, creating the exposed end segment 77 of the inner ply 72. the annular collar 35 is slipped over the end of the hose, and the ferrule 62 is forced into the hose, causing the inner and outer plies 72 and 73 to be deformed into engagement with the annular ribs 54 and 64. The collar 35 may be provided with a seating recess 78 in its interior surface for receiving a mating seating flange 79 on the end of the ferrule 62. The flange thus snaps into the recess to seat and stabilize the ferrule within the collar. Again, it will be understood that while assembly of the collar 35 of a female coupling section 32 on the hose end has been illustrated and described, a male coupling section 34 is assembled in an essentially identical manner.

As indicated above, the components of the novel hose coupling of the invention are particularly suited for fabrication from a durable, resilient, elastomeric plastic material. The coupling thus returns to and retains its original shape even when temporarily deformed. The barb construction of the invention, that is, the negative rake angle configuration, is particularly advantageous in the coupling. Thus, it has been found that with conventional barb configurations, wherein the radial wall of the barb is normal to the longitudinal axis of the coupling member, the tip or point of the barb tends to indent into and crush the hose wall upon assembly. As a pulling force is applied to the hose, the point area of the barb tends to deflect along an arc drawing it away from the hose wall and allowing the hose material to flow over the point area. With the negative rake angle configuration of the invention, on the other hand, wherein the radial walls of the barbs, as molded, are angularly displaced from a plane normal to the longitudinal axis, the points of the barbs tend to penetrate into the hose material upon assembly of the coupling. When a pulling force is applied to the hose, the point area tends to deflect along an arc resulting in further penetration of the point into the hose material. The negative rake angle thus enhances the integrity of the joint relative to joints employing conventional barb configurations.

It is to be understood that the forms of the invention herewith shown and described are to be taken as illustrative embodiments only of the same, and that various changes in the shape, size and arrangement of parts may be reasserted to without departing from the spirit of the invention.

I claim:

1. In a coupling member for hoses, a flexible coupling section having a central bore of a diameter substantially equal to the outside diameter of said hose and adapted to fit over the end segment of said hose, said coupling section including a threaded portion for coupling said member to a mating coupling section, said bore being defined by an interior cylindrical wall within said coupling member, a series of annular barbs formed in said cylindrical wall and defining spaced apexes separated by recessed areas, said annular barbs having a reverse rake angle, each said barb comprising a base sloping rearwardly and outwardly to a juncture with a radial wall extending inwardly and forwardly therefrom, said juncture defining a said apex, said apexes being longitudinally aligned along lines parallel to the longitudinal axis of said central bore, and a tubular ferrule within the interior of said end segment urging the wall of said hose section outwardly into said barbs, said tubular ferrule including a central passageway having a cross-sectional area substantially equivalent to the interior passage of said hose, and an annular rib projecting toward a said recessed area between apexes of said barbs.

2. A coupling member as defined in claim 1, wherein said radial wall is disposed at an angle of about 15 degrees from normal to the longitudinal axis of said bore.

3. A coupling member as defined in claim 2, wherein said base and said radial wall define an angle of about 75 degrees therebetween.

4. A coupling member as defined in claim 1, wherein said ferrule comprises a tubular member of permanently deformable material inserted in said end segment and expanded to urge said wall into engagement with said barbs.

5. A coupling member as defined in claim 4, including an O-ring surrounding said tubular member outwardly beyond the end of said hose section and expanded with said tubular member into sealing engagement with said interior wall of said coupling member.

6. A coupling member as defined in claim 4, wherein said annular rib comprises a corrugation formed in the wall of said tubular member as it is expanded.

7. A coupling member as defined in claim 1, wherein said ferrule comprises a non-expanding tubular member adapted to be forced axially into said end segment to expand said wall into engagement with said barbs.

8. A coupling member as defined in claim 7, wherein said ferrule includes spaced annular barbs on its outer surface of a configuration similar to said barbs in said interior cylindrical wall and directed opposite thereto, an apex of said barbs on said ferrule comprising said annular rib.

9. A coupling member as defined in claim 1, wherein said coupling section comprises a hub within which said annular barbs are formed, and an integral axially projecting fitting having said threaded portion formed on its outer surface.

10. A coupling member as defined in claim 1, wherein said coupling section comprises a collar within which said annular barbs are formed, an annular flange formed on the forward end of said collar defining a channel therebehind, and including a separate tubular connector having a central bore therethrough, said threaded portion being formed within said bore at one end of said connector, said connector having an inwardly directed annular lip at its other end adapted to snap-fit over and engage behind said annular flange within said channel, whereby said tubular connector is restrained axially on said collar and adapted to freely rotate relative thereto.

11. A coupling member as defined in claim 10, including a second coupling section comprising said mating coupling section, said second section including a hub with a central bore and having annular barbs formed within said bore, and an integral, axially projecting fitting with a threaded portion on its outer surface adapted to mate with said threaded portion of said tubular connector for joining said first named and said second coupling sections.

* * * * *